(12) United States Patent
Rogers et al.

(10) Patent No.: US 6,715,662 B2
(45) Date of Patent: Apr. 6, 2004

(54) WASTE ENERGY RECOVERY SYSTEM FOR A CONTROLLED ATMOSPHERE SYSTEM

(75) Inventors: William A. Rogers, Connersville, IN (US); Donald A. Marangoni, Centerville, IN (US); Steven G. Dennis, Connersville, IN (US)

(73) Assignee: Rogers Engineering & Manufacturing Co., Inc., Cambridge City, IN (US)

(*) Notice: Subject to any disclaimer, the term of this patent is extended or adjusted under 35 U.S.C. 154(b) by 0 days.

(21) Appl. No.: 10/173,179

(22) Filed: Jun. 17, 2002

(65) Prior Publication Data

US 2003/0222119 A1 Dec. 4, 2003

Related U.S. Application Data

(60) Provisional application No. 60/384,049, filed on May 29, 2002.

(51) Int. Cl.[7] .......................... B23K 31/02; F27B 9/00; F27D 7/04
(52) U.S. Cl. .......................... 228/102; 228/9; 228/42; 228/221; 219/388; 432/199; 110/204
(58) Field of Search ................. 228/219, 102, 228/8, 9, 221, 42, 101, 43; 219/388; 432/29, 199; 110/204

(56) References Cited

U.S. PATENT DOCUMENTS

| | | | | |
|---|---|---|---|---|
| 3,604,824 A | * | 9/1971 | Hardison | 431/116 |
| 3,627,290 A | * | 12/1971 | Grieve | 432/48 |
| 3,756,489 A | * | 9/1973 | Chartet | 228/43 |
| 4,294,395 A | * | 10/1981 | Nayar | 228/220 |
| 4,610,390 A | * | 9/1986 | Takahashi | 228/207 |
| 4,772,199 A | * | 9/1988 | Hartmann | 432/133 |
| 4,886,449 A | * | 12/1989 | Brittin | 432/121 |
| 4,898,319 A | * | 2/1990 | Williams | 228/219 |
| 4,957,710 A | * | 9/1990 | Nagai et al. | 422/171 |
| 5,147,083 A | * | 9/1992 | Halstead et al. | 228/42 |
| 5,193,735 A | * | 3/1993 | Knight | 228/42 |
| 5,195,673 A | * | 3/1993 | Irish et al. | 228/18 |
| 5,244,144 A | * | 9/1993 | Osame et al. | 228/219 |
| 5,322,209 A | * | 6/1994 | Barten et al. | 228/183 |
| 5,328,084 A | * | 7/1994 | Halstead et al. | 228/18 |
| 5,454,507 A | * | 10/1995 | Tanaka et al. | 228/221 |
| 5,628,629 A | * | 5/1997 | Mitani et al. | 432/180 |
| 6,354,481 B1 | * | 3/2002 | Rich et al. | 228/19 |
| 6,495,800 B2 | * | 12/2002 | Richert et al. | 219/388 |
| 2001/0051323 A1 | * | 12/2001 | Nishimura | |
| 2003/0019917 A1 | * | 1/2003 | Furuno et al. | |

FOREIGN PATENT DOCUMENTS

JP    08303729 A  * 11/1996

OTHER PUBLICATIONS

Translation of JP–08303729A.*

* cited by examiner

Primary Examiner—Kiley Stoner
(74) Attorney, Agent, or Firm—Maginot Moore & Beck

(57) ABSTRACT

A continuous controlled atmosphere brazing system includes a dry-off oven for driving off moisture from materials to be brazed, a pre-heat section for pre-heating the material and a brazing furnace for brazing the materials. Heated gas produced in the pre-heat section and the brazing furnace is conveyed along a flowpath to the chamber of the dry-off oven to provide substantially the sole source of heat for the oven. The flowpath for the heated gas is defined by a series of tubes in communication with each component of the brazing system and intermediate manifolds disposed between components. The discharge mouths of the tubes open into the oven chamber at the suction side of recirculation fans operating within the oven. The overall temperature of the oven can be regulated by controllably mixing ambient air with the heated gas in relation to the oven temperature.

29 Claims, 6 Drawing Sheets

WASTE ENERGY RECOVERY SYSTEM FOR A CONTROLLED ATMOSPHERE SYSTEM

REFERENCE TO RELATED APPLICATIONS

This application claims priority to now abandoned provisional application, Serial No. 60/384,049, filed on May 29, 2002, having the title "Waste Energy Recuperation System", the disclosure of which is incorporated herein by reference.

BACKGROUND OF THE INVENTION

The present invention relates to waste energy or heat recovery system for use with controlled atmosphere environments, such as a controlled atmosphere brazing system. The invention particularly pertains to a system for recovering heat from the heated sections of the brazing system for use in a dry-off oven.

Brazing is a commonly used technique for joining metal parts with close fitting joints. Typically, a flux material is disposed at the location of the joint and then melted within a furnace or oven to flow into the gap between adjacent parts. Most commercial brazing operations are carried out on a continuous conveyor belt that passes through heated sections, or furnaces, of the brazing system. The furnaces are usually fitted with a muffle disposed within a refractory structure. The muffle is heated by the use of natural gas and/or electric heating elements outside the muffle. The brazing environment within the muffle is maintained as a controlled atmosphere, meaning that the atmosphere is maintained to facilitate the brazing process and to prevent oxidation or coloration. Typically, the controlled atmosphere is maintained by continuously pumping nitrogen into the muffle.

In order to ensure an optimum braze, it is first necessary to eliminate any moisture from the metal parts of the flux. Thus, most brazing systems include a dry-off or dehydration oven between the fluxer and the controlled atmosphere furnaces. The purpose of the dry-off oven is to raise the core part temperature sufficiently high to evaporation off all moisture from the part. Typically, a dry-off oven will raise the part temperature to 150° C. (350° F.) in an air atmosphere.

Thus, it can be appreciated that the standard continuous belt brazing system will include a number of ovens or furnaces that include their own heating element(s). The braze furnace will often be heated by a combination of gas fired zones and electric zones. Where a pre-heater is employed to increase the flux and core temperature, the pre-heater furnace will usually be gas fired, but may also include additional electrically heated zones. Finally, the conventional dry-off oven can be gas fired and/or electrically heated. Each one of these units produces hot gas and products of combustion that must be exhausted to the outside of the building housing the brazing system. These hot gases require special handling, such as alloy ducts, insulated ducts and high temperature exhaust fans. Moreover, energy contained within these hot gases is lost to the atmosphere.

Much effort has been expended to make the brazing process more efficient and to reduce the overall energy requirements for the brazing system. More efficient gas-fired or electrical heating elements have reduced the fuel requirements and provided more efficient heating of the various sections of the brazing system. Improved venting systems are better able to discharge the waste gases from the various brazing system sections. However, there remains a need for even greater improvements to the heating of the brazing system and to the handling of the waste gases associated with the system.

SUMMARY OF THE INVENTION

In order to address these needs, the present invention contemplates a waste energy, or heat, recovery system that is integrated into a serial closed-atmosphere process. A system of pipes extract hot gas from the heated downstream components of the serial process and feed them to heated components at the upstream end of the process. This recycled hot gas provides a portion or even all of the heating requirements for the upstream heated component. In one embodiment, the recovery system extracts hot gas from each downstream heated component, and returns that hot gas to the upstream component. It should be understood that the recovery system can redirect hot gas from any component of the system to any other component, not just simply from downstream component to upstream component.

In another aspect, the recovery system extracts all of the hot gas from the downstream components and circulates all of the hot gas through the upstream component. In order to modulate or control the temperature of this upstream component, ambient air can be fed into the upstream component to mix with the recycled hot gas. A temperature sensor can be provided at the upstream component to monitor the temperature and regulate the inflow of ambient air to mix with the recycled hot gas.

In one feature of the invention, the waste energy recovery system of the present invention is integrated into a continuous controlled atmosphere brazing system. The brazing system can include one or more downstream heated components, such as a brazing furnace or a pre-heat furnace. The brazing system also includes an upstream dry-off oven. Rather than provide the dry-off oven with its own heat source, the recovery system of the present invention recirculates the hot gas from each of the downstream components back to the interior of the dry-off oven. In one aspect, this recirculation can be accomplished by a series of tube extending along the process path and projecting into the heated portion of each downstream component. An insulated manifold can be disposed between adjacent heated components with the recirculation tubes from each component opening into the interior of the manifold.

The waste energy recovery system includes a flow device that draws the hot gas from the heated portion of each heated component of the brazing system and directs that hot gas through the upstream component. In certain embodiments, the flow device can include fans disposed within the upstream dry-off oven with the end of the recirculating tubes at the suction side of the fans. Thus, the fans continuously draw the hot gas from the downstream components. In addition, the fans can be sized and positioned to draw ambient air into the dry-off oven. In some embodiments, the ambient air is provided through the inlet to the oven and/or through an additional air inlet.

The air inlet into the upstream dry-off oven can be modulated by a control valve. The control valve can control entry of air into the oven at the suction side of the fans. In certain aspects, the control valve can be regulated by a temperature sensor disposed within the dry-off oven. The temperature signal from the sensor can be used by the control valve to close or open a valve within the airflow path into the oven, or to modulate the position of the valve and therefore the flow rate of ambient air. The valve can be a variable position butterfly valve within an air intake plenum.

In certain embodiments, the recirculation tubes can extend into the heated portions of the downstream heated components. Multiple tubes can be provided, with each tube extending into a different heating zone within the component. Similarly, at the upstream end, multiple tubes can extend from an upstream manifold into the dry-off oven. A greater number of tubes can exhaust at the intake end of the oven to more quickly raise the part and flux temperature.

It is one object of the present invention to provide a system for recovery and using waste energy or heat energy from a process that would otherwise be exhausted form the process. In the context of a continuous brazing system, it is an object of the invention to utilize the hot gases generated in heating a brazing furnace and/or a pre-heater.

One benefit of the present invention is that is can significantly reduce the energy requirements for a continuous heated process. More specific to a continuous brazing system, the present invention beneficially allows the use of a "burnerless" dry-off oven.

Another benefit achieved by the recovery system of the present invention is that it reduces the requirements for exhausting hot gas outside the process facility. These reduced requirements can translate into lower cost for building the process facility, as well as reduced environmental effects.

Other objects and benefits of the present invention will become apparent upon consideration of the following written description, taken together with the accompanying figures.

DESCRIPTION OF THE PREFERRED EMBODIMENTS

Figure 1:
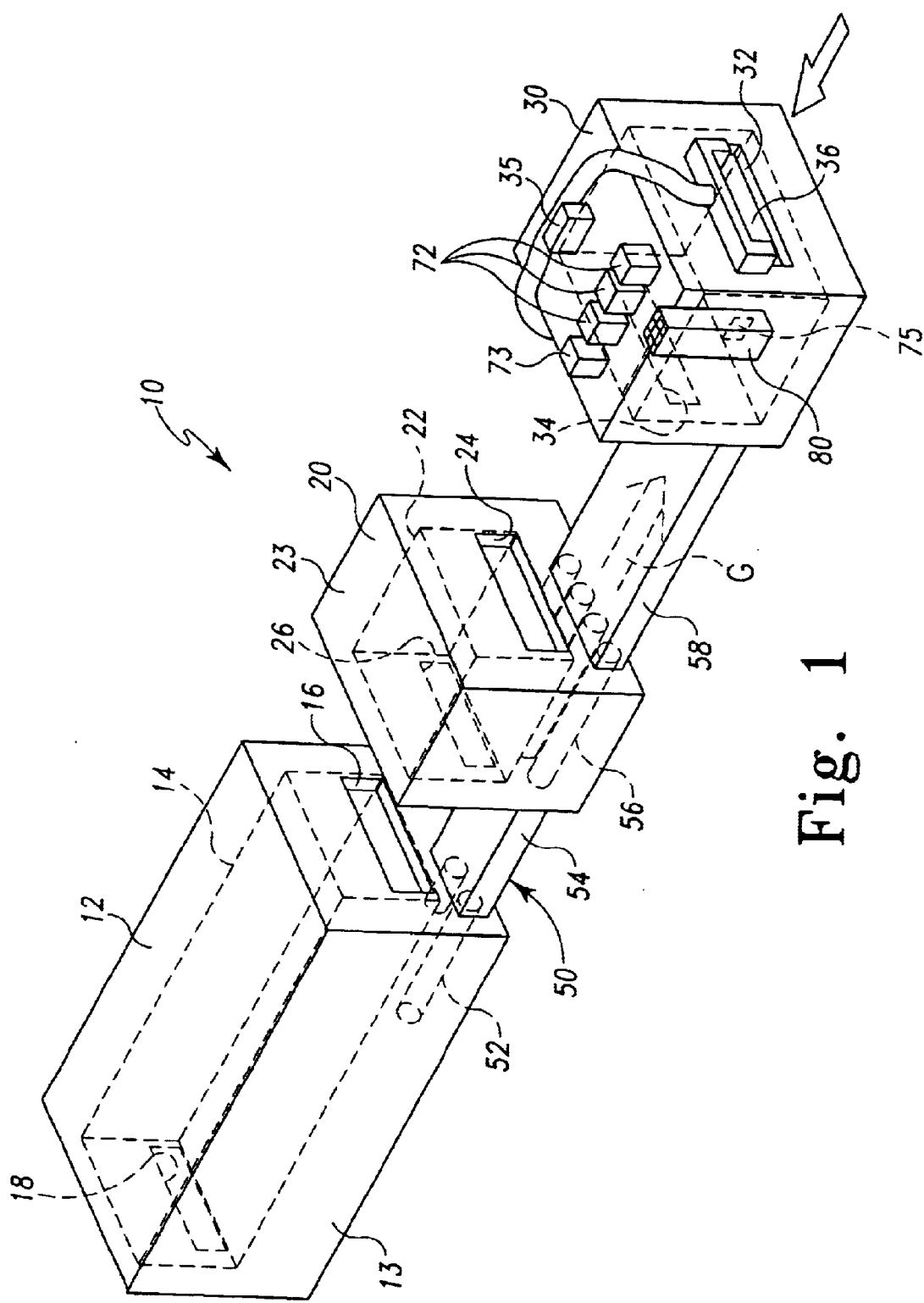
FIG. 1 is a general perspective view of one type of continuous brazing system incorporating the waste energy recovery system of one embodiment of the present invention.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

A continuous brazing system 10, shown in FIG. 1, includes a braze section or brazing furnace 12 at the discharge end of a continuous serial process. The brazing furnace can be of conventional construction with a muffle 14 disposed within a refractory furnace containment 13. Stock material and flux are fed into the muffle 14 through an inlet 16 and exit the brazing system 10 through outlet 18. In addition, the system 10 can include a pre-heat section 20 that also includes a muffle 22 within the furnace containment 23. Stock material and flux enter through the inlet 24 and exit through the outlet 26 to be conveyed to the brazing furnace 12.

As is typical with most continuous brazing systems, the muffles 14, 22 provide a controlled atmosphere and include means for maintaining that controlled atmosphere within the interior of the muffle. In an aluminum brazing system, the atmosphere is primarily composed of nitrogen. In order to maintain this controlled atmosphere, the system 10 is provided with a vestibule 42 between the outlet 26 of the pre-heat section 20 and the inlet 16 of the brazing furnace. Likewise, a vestibule 44 can be provided at the inlet 24 of the pre-heat section 20. The vestibules 42, 44 can be of conventional construction.

With the downstream components of the system 10 described, attention can turn to the dry-off oven 30 at the upstream end of the process. The dry-off oven receives stock material and flux after it has left the fluxer. The oven 30 includes an inlet 32 and an outlet 34 that provide a path for the material through the oven. It is understood that the dry-off oven 30, as well as the downstream pre-heat section 20 and brazing furnace 12 can be integrated with a continuous conveyor system extending through the respective inlets and outlets.

The dry-off oven 30 can include exhaust unit 35 that are operable to exhaust spent gas from the chamber 36 of the oven. (Note: for clarity, the exhaust unit 35 is not depicted in FIGS. 2, 3). The exhaust unit 35 can be of a variety of configurations to exhaust the gases from the oven to the atmosphere. Typically, the exhaust unit 35 comprises one or more rotary fans connected to discharge outlets or shrouds at the ends of the oven 30, or more particularly shrouds situated around the perimeter of the inlet 32 and outlet 34. The fans can feed the exhaust gas to one or more exhaust stacks outside the building housing the system 10.

Figure 2:
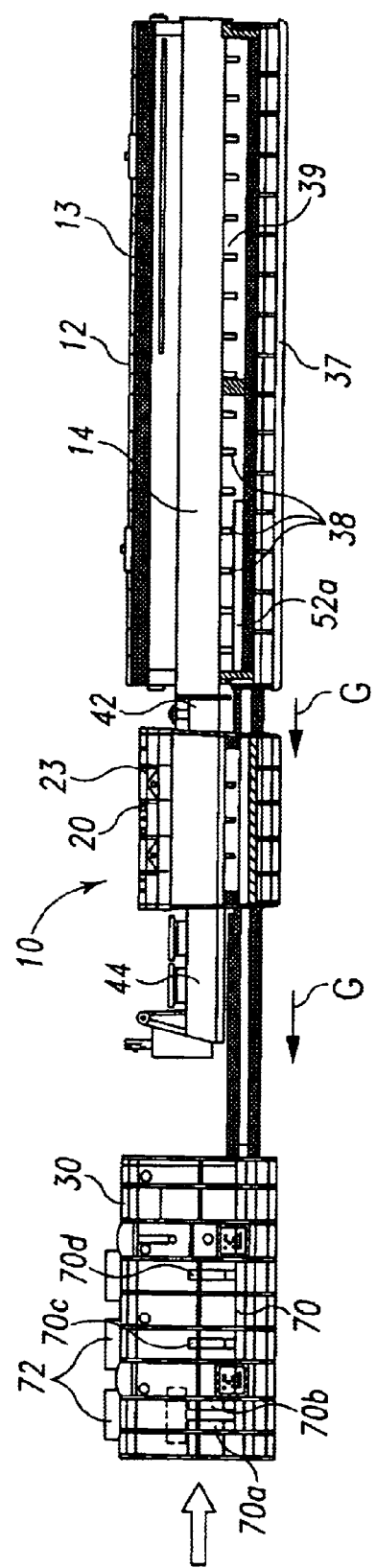
FIG. 2 is side elevational view of the continuous brazing system shown in FIG. 1.

The brazing furnace 12 and pre-heat section 20 can be of conventional design. More specifically, these downstream components of the system 10 can be heated in a conventional manner, such as by gas fired or electrical heating elements, or both. As shown in FIG. 2, the brazing furnace can include rails 38 to support the muffle 14 within the furnace containment 13. The furnace walls 37 (FIG. 4) define a heating region 39 that surrounds the muffle. The heating elements are typically disposed at the bottom wall of the containment 13. Most brazing furnaces include multiple zones of heating, sometimes followed by a cooling zone. In the illustrated example, the brazing furnace includes five temperature zones. The pre-heat section 20 also defines a heating region similar to the brazing furnace, although the pre-heat section will usually include fewer temperature zones.

Regardless of the manner in which the heating region 39 is heated, hot gas is produced within the brazing furnace 12 and pre-heat section 20. In the conventional continuous brazing system of the prior art, these hot gases are discharged to the atmosphere. In these prior systems, high temperature exhaust components are required to handle the extremely high temperature (exceeding 1000° C.) gases produced within the furnaces. In addition, a separate exhaust stack is usually required for each component. This is where the present invention departs from these prior systems.

In particular, the present invention contemplates a waste energy, or heat, recovery system 50. The system 50 draws the hot gas from the heated stages of the system 10 and circulates the gas back to the dry-off oven 30. More specifically, the hot gases from the brazing furnace 12 and pre-heat section 20 are recycled back to the oven 30, thereby supplying the oven with all, or at least some portion, of its heating requirements. Ideally, the oven 30 can be a "burnerless" oven, meaning that it does not require any separate heating source, such as a gas-fired or electric heating element. Instead, the high temperature gas drawn from the downstream components of the system 10 are sufficient to raise the temperature within the chamber 32 of the oven 30 to well-above the desired temperature.

Figure 3:
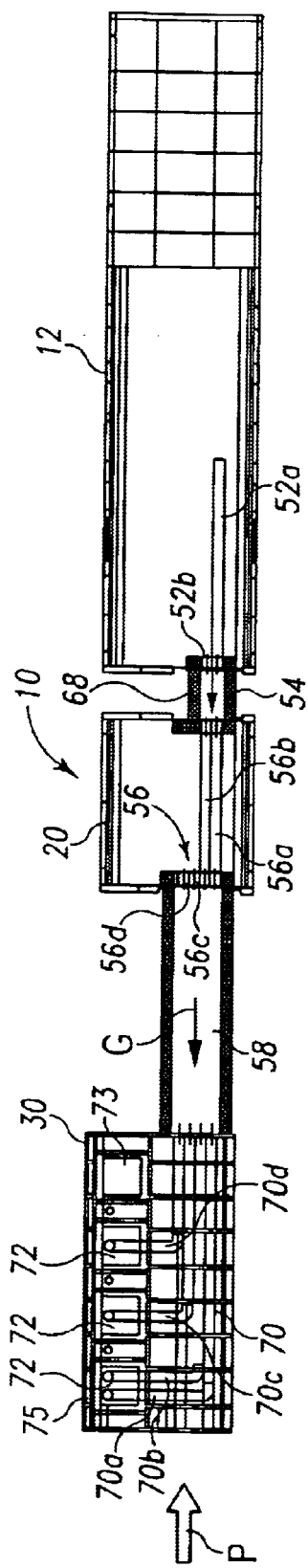
FIG. 3 is a top elevational cut-away view of the continuous brazing system shown in FIG. 2.

In accordance with an embodiment of the invention, the recovery system 50 includes a number of exhaust recovery tubes 52 disposed within the heating region 39 of the brazing furnace 12, as shown in FIGS. 2 and 3. The tubes 52 communicate with a transition manifold 54 disposed between the furnace 12 and the pre-heat section 20. Additional exhaust recovery tubes 56 are situated within the heating region of the pre-heat section 20, each opening into an upstream transition manifold 58. The upstream manifold is disposed between the pre-heat section 20 and the dry-off oven 30.

Figure 4:
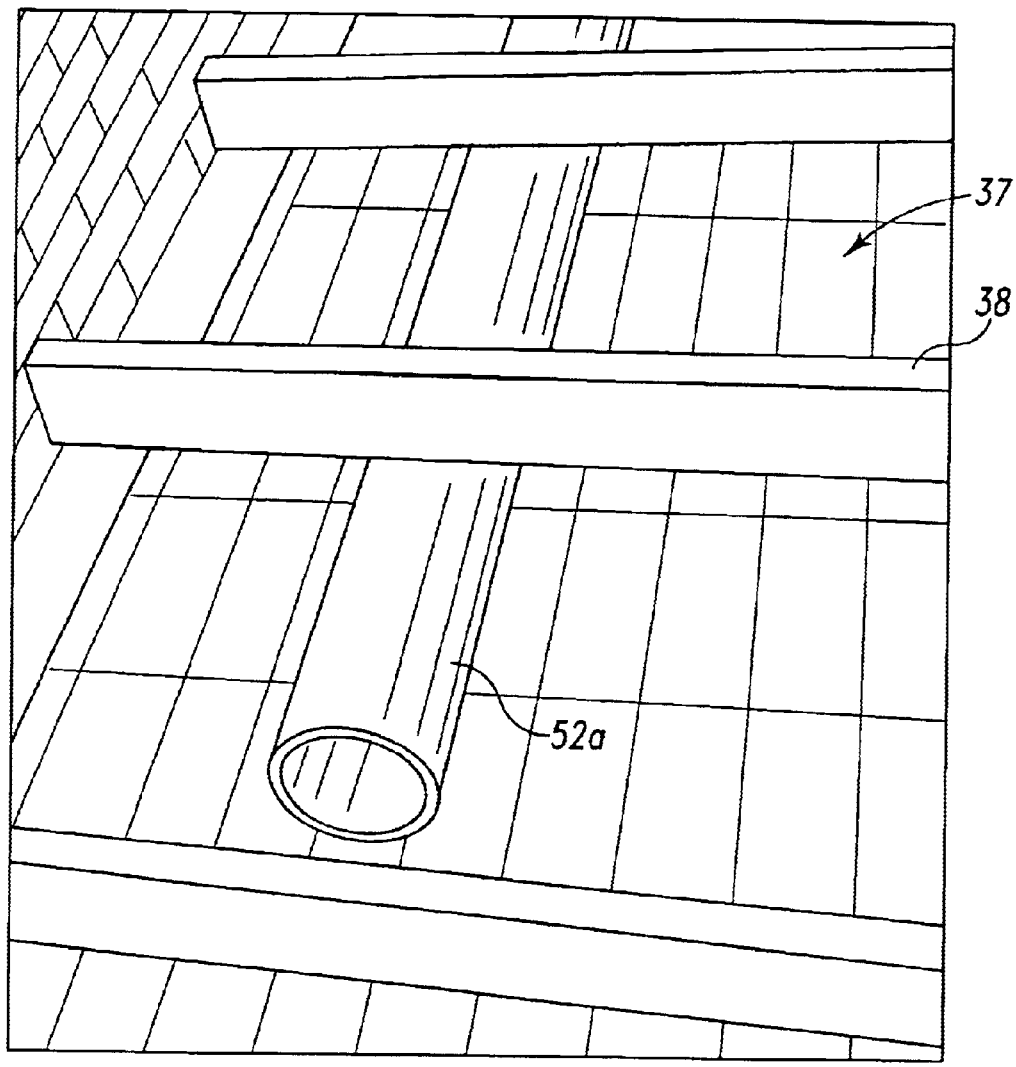
FIG. 4 is an end perspective view of the interior of the braze furnace component of the continuous brazing system shown in the prior figures, illustrating the placement of a recirculation tube within the furnace.

The exhaust recovery tubes 52 can include more than one tube, such as tubes 52a and 52b. As seen best in FIG. 3, tube 52a extends farther into the furnace 12 than the other tube 52b. In one feature of the invention, the number of recovery tubes can have their respective mouths disposed in different heating zones within the furnace. In the illustrated embodiment, the two tubes 52a, 52b draw hot gas from two different heating zones. As shown in FIG. 4, the longer of the two tubes, tube 52a, is disposed on the bottom wall 37 of the furnace containment 13, and below the rails 38 that support the muffle 14. The mouth of the tube 52a can be provided with suitable filtering.

The tubes 56 associated with the pre-heat section 20 can include a number of tubes, such as tubes 56a, 56b, that extend entirely through the section. More particularly, these tubes 56a, 56b communicate with the transition manifold 54 which receives hot gas from the brazing furnace 12. The transition manifold 54 and tubes 56a, 56b provide a generally leak-proof path for the brazing furnace gas to pass through the pre-heat section. In this way, the hot gas recovered from the downstream brazing furnace will not affect the temperature within the pre-heat section. The tubes 56a, 56b can be insulated to further reduce the possibility of convection heating of the pre-heat section by hot gas flowing through the tubes. The waste heat from the pre-heat section can be scavenged by additional tubes 56c, 56d. Like the brazing furnace, the pre-heat section may include multiple temperature zones, in which case one of the tubes 56c, 56d may extend farther into the interior of the pre-heat section. In the illustrated embodiment, a single heating zone is employed, so both tubes 56c, 56d are directly adjacent the inlet to the section 20.

In the illustrated embodiment, the gas flows from each downstream component 12, 20, to the upstream component 30 in the flow direction designated by arrow G in FIGS. 2 and 4. This flow direction is counter to the product conveyance direction through the muffles, as designated by the arrow P. This gas flow direction is dictated by the placement of the components of the system 10 that are heated to the higher temperatures, relative to the components that require lesser temperatures. In some continuous brazing systems, a cool-down section may be provided downstream of the brazing furnace 12 which is heated to above ambient temperature in order to gradually cool the brazed materials. In this instance, the waste energy recovery system 50 can include tubes and transition manifolds directing hot gas to the cool-down section. The cool-down section can be constructed like the dry-off oven 30, as described above and in more detail below.

Figure 5:
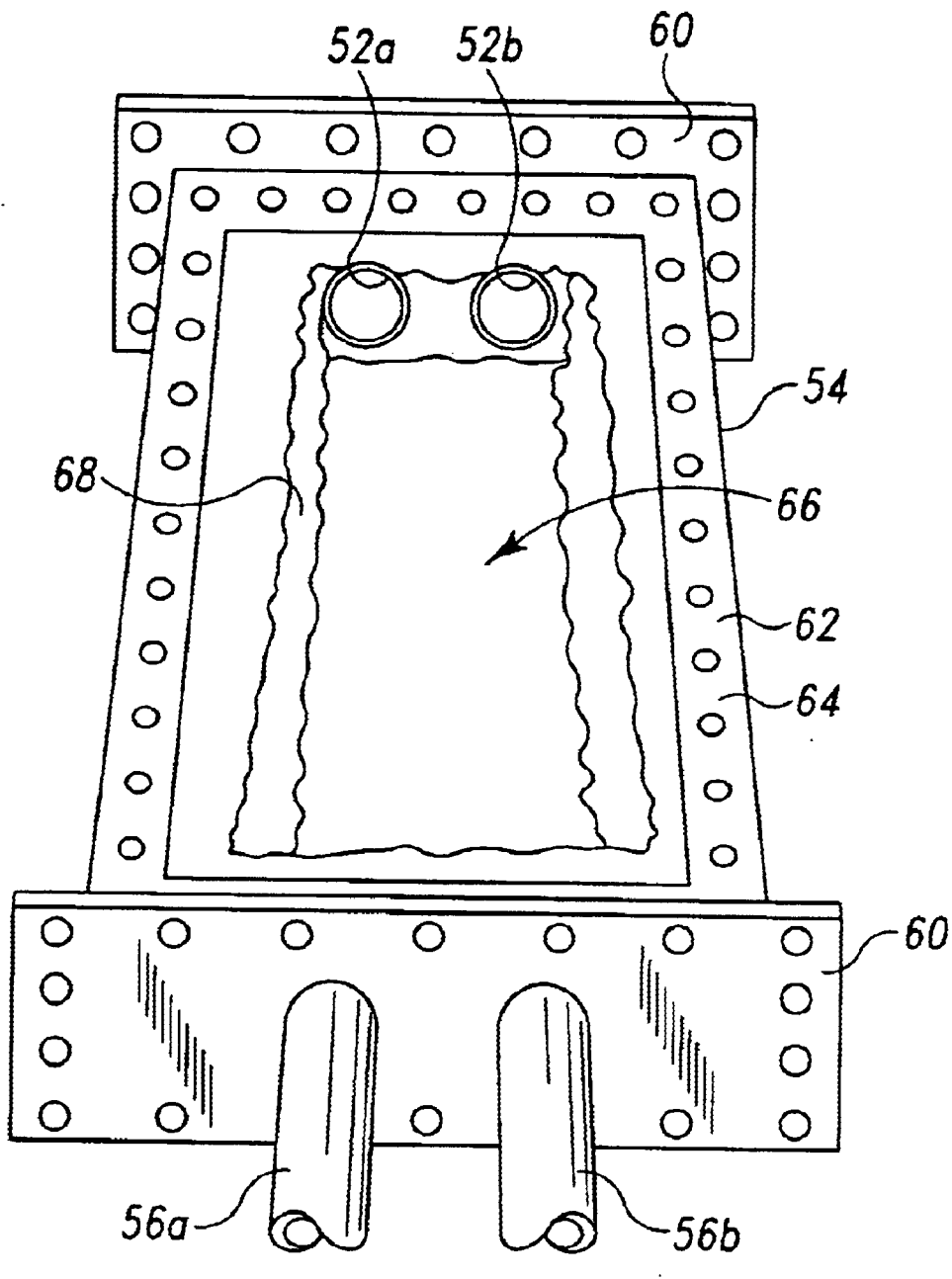
FIG. 5 is an end perspective view of the interior of a transition manifold of the waste energy recovery system shown in FIGS. 1–3.

Referring not to FIG. 5, details of the transition manifolds can be discerned. The transition manifold 54 is disposed between the brazing furnace 12 and pre-heat section 20. Thus, tubes 52a, 52b enter the manifold 54 at one end, while tubes 56a, 56b exit the manifold from its opposite end. As seen in the figure, the manifold 54 provides an open chamber 66 in communication with the mouths of the various tubes 52a, 52b, 56a, 56b. In the illustrated embodiment, the manifold 54 is formed from two manifold halves, such as half 62. The two halves 62 can be joined and sealed around a bolt flange 64. The manifold 54 can be mounted to the adjacent components by way of end mounting flanges 60. The manifold halves 62 can be joined at the bolt flange 64 and the mounting flanges 60 engaged to the system components by a conventional nut and bolt construct. Alternatively, the components can be welded for a more permanent connection.

The interior chamber 66 of the manifold 54 is lined with insulation 68. Since the transition manifolds are exposed to ambient conditions, it is desirable that the manifolds include at least some insulation to prevent heat loss through the manifolds. Preferably, the manifolds 54, 58 are constructed of stainless steel, as are the various tubes. The insulation is preferably a high-grade material capable of sustaining the high gas temperatures (exceeding 1000° C.) exiting the brazing furnace. For instance, the insulation material can be a loose-fill insulation such as alumina-silica fiber, or a castable cement with refractory fibers.

As seen in the top view of the system 10 in FIG. 3, the recovery system 50, and specifically the manifolds and tubes, are offset to one side of the system components. This offset is principally for maintenance and construction convenience. Offsetting the recovery system 50 toward one side provides easier access to the system for installation of the system and for replacement of system components. In addition, offsetting the recirculation tubes toward one side may better accommodate the heating elements within the furnace 12 or pre-heat section 20.

Referring again to FIGS. 1–3, additional details of the recovery system and its integration into the dry-off oven will be described. The upstream manifold 58 is connected between the inlet end of the pre-heat section 20 and the outlet end of the oven. Hot gas flows through the manifold 58 and into recirculation tubes 70 within the dry-off oven. It should be understood that these recirculation tubes 70 can replace the conventional heating elements that have been used to heat prior dry-off ovens. Thus, the placement of the tubes 70 within the oven is not constrained by other heating elements. Instead, the primary goal in placing the recirculation tubes 70 is to ensure uniform heating of the chamber 36 through which the feed materials pass along the continuous conveyor.

In the illustrated embodiment, the recirculation tubes 70 include four tubes 70a–70d that are dispersed along the length of the oven 30. In one feature, two tubes 70a, 70b are situated adjacent the inlet 32 to pump the majority of the hot gas into the oven at the inlet side. The remaining two tubes 70c, 70d can be evenly spaced from the front two tubes, and can be positioned to leave a zone at the outlet of the oven without any recirculation tubes. With this arrangement, the heat within the oven is concentrated toward the inlet side so that the conveyed materials are fully heated as they pass through the oven 30, thereby ensuring that all moisture will be evaporated by the time the materials exit the oven.

The waste energy recovery system 50 further contemplates means for drawing the hot gas through the system in the flow direction G, or more specifically from the heated components of the system to the "burnerless" dry-off oven 30. To that end, one or more gas flow devices or gas pumps can be disposed at locations throughout the system 50. A preferred gas flow means has been found to be recirculation fans, such as fans 72, disposed within the oven. In this instance, the outlet mouth of the recirculation tubes 70*a*–*d* open at the negative pressure side of a corresponding one of the fans 72, as depicted in FIG. 2. With this configuration, operation of the fans draws a suction pressure along the tubes 70*a*–*d*, and through the upstream elements of the recovery system 50. Thus, the gas moving elements of the system 50 are contained in one location and are more readily accessible than flow devices dispersed throughout the system. In the illustrated embodiment, the fans 72, 73 can be 16" diameter, 4500 CFM units.

The recirculation fans 72 thus draw heated gas from the upstream portions of the recovery system, namely from the heating region of the furnace 12 and pre-heat section 20. An additional recirculation fan 73 can be provided near the outlet of the oven 30 to provide gas circulation at the exit of the oven. Ambient air naturally flows through the inlet 32 and outlet 34 openings. The ambient air/hot gas mixture naturally has a lower temperature than the gases drawn from the brazing system components 12, 20. However, the supply of ambient air through the opening 32 may not be sufficient to reduce the temperature of the resulting gas mixture to acceptable levels.

Figure 6:
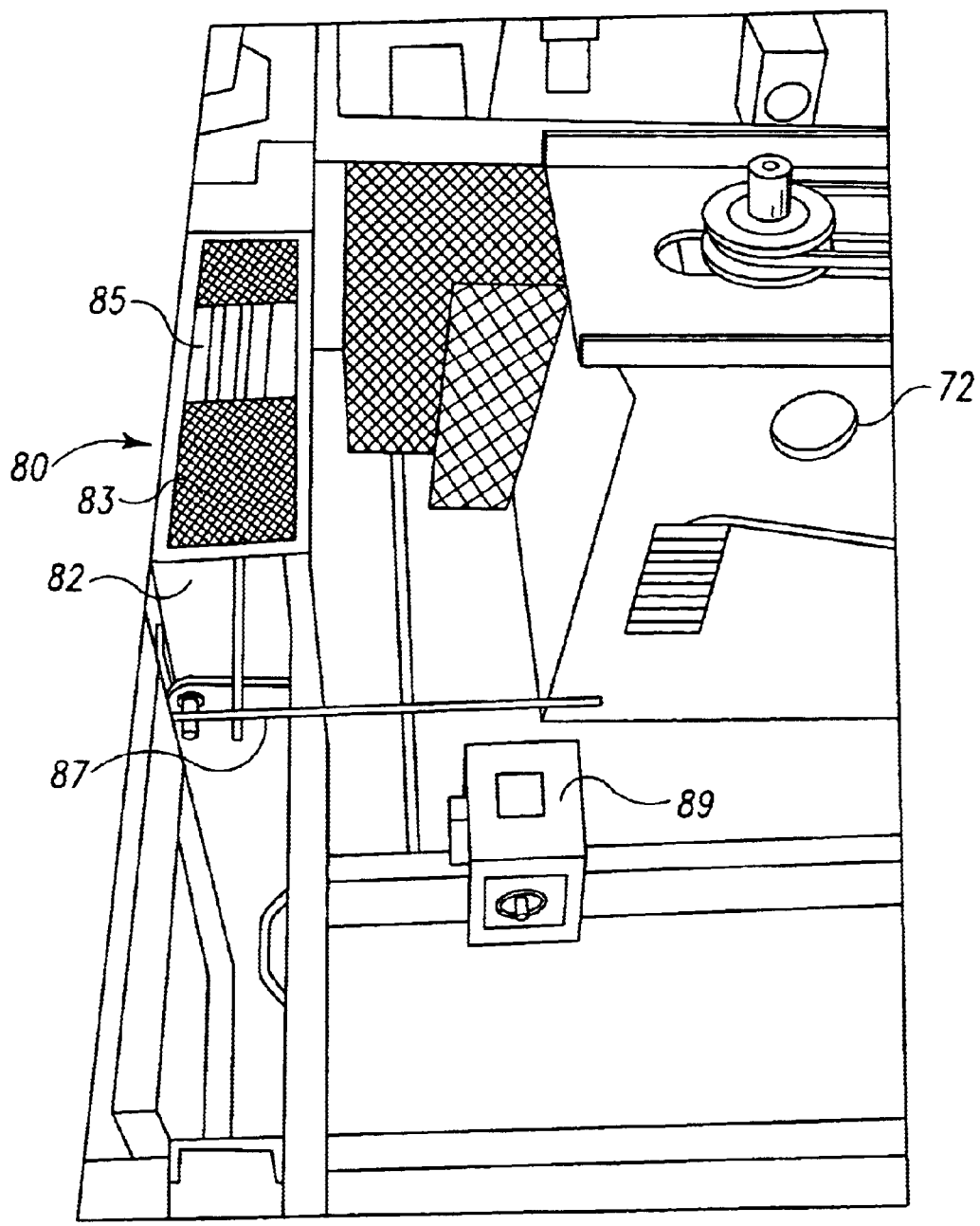
FIG. 6 is a top perspective view of an ambient airflow apparatus of the waste energy recovery system shown in FIGS. 1–3.

In order to address this difficulty, an ambient airflow apparatus 80 can be provided. In general terms, this apparatus 80 provides for controlled flow of ambient air into the oven 30 to achieve a predetermined temperature within the oven. In one embodiment, the apparatus 80 can include an ambient air inlet 75 associated with at least one of the recirculation fans 72, 73. Ambient air is fed to the inlet through an intake plenum 82 that is preferably mounted to the side of the oven 30. The mouth of the plenum 82 can be covered by a screen 83 to prevent entry of unwanted materials into the oven, as shown in FIG. 6.

A valve element 85 (FIG. 6) is disposed at the mouth of the plenum 82 to control the flow of ambient air into the plenum. In one embodiment, the valve 85 can be a butterfly valve that rotates about its long axis from a position substantially closing the plenum mouth to a position in which the mouth is substantially unobstructed. In other words, the valve 85 can be pivoted from a no flow to a full flow position. The ambient airflow apparatus 80 further contemplates means for controlling the movement of the valve 85 between its two extreme positions. In one aspect, this means can include an actuator 89 that controls the movement of the valve 82 through a linkage 87. The actuator 89 can be an on-off type actuator, such as a solenoid, that is only capable of moving the valve 82 between its full open and full closed positions. In other embodiments, the actuator 89 can capable of incremental movements to accomplish fully controlled opening and closing of the valve. Thus, the actuator 89 can include a stepper motor or a lead screw mechanism.

Operation of the actuator 89 can be controlled by a temperature sensor (not shown) disposed within the chamber 36 of the oven 30. The temperature sensor can ascertain the temperature within the oven, or can provide a reading relative to a pre-determined temperature set point. For instance, the temperature sensor can include a thermocouple or a thermistor that generates an electrical signal in proportion to the sensed temperature. The actuator 89 can include circuitry to operate on the temperature sensor generated electrical signal to ultimately control the movement of the actuator. Temperature controlled actuators are widely known and a variety of such actuator and temperature sensor combination can be implemented within the ambient airflow apparatus 80 of the present invention. Ordinarily the oven 30 can withstand a wide temperature range, so high precision control of the valve 82 is not essential.

Although one ambient airflow apparatus 80 is shown, additional units can be provided. Specifically, another apparatus 80 can be situated adjacent the fan 73, or any of the other fans 72. The actuator associated with the additional airflow apparatus can be controlled by the same temperature sensor as the apparatus 80, or can include its own temperature sensor.

As may be appreciated, the brazing system 10 incorporating the waste energy recovery system 50 of the present invention requires only a single exhaust for the entire system. In particular, the exhaust units 35 mounted on the oven 30 handle the discharge of all gases within the system. Therein lies one benefit of the present invention, namely that there is no need to exhaust hot gas from each section of the brazing system. Instead, all of the hot gases generated in the brazing furnace 12 and pre-heat section 20 can be fed through and exhausted from the dry-off oven 30.

In addition to providing a centralized exhaust for the brazing system, the recovery system 50 also provides means for tempering the gas discharged into the atmosphere. In particular, since the temperature of the dry-off oven is significantly lower than the downstream components 12, 20, the temperature of the discharged gas is naturally lower. This lower temperature means that high temperature exhaust components are not required, and that the environmental impact of the exhaust is minimized.

The various elements of the waste energy recovery system 50 can be sized for the anticipated rates of hot gas production within the brazing system components, the length of travel of the hot gas to the dry-off oven, the size of the oven and the temperatures in the brazing furnace 12, pre-heat section 20 and dry-off oven 30. In the illustrated embodiment, the recirculation tubes are 6" diameter 304SS pipes. The tube 52*a* has a length of 113" and is preferably supported near its free end.

In addition, in the-illustrated embodiment, the two transition manifolds 54, 58 have respective lengths of 34" and 172". The chamber 66 within each manifold is 6⅝" high, with the width determined by the number of tubes in communication with the chamber. For the manifold 54, the chamber width is 17¾', while the larger manifold 58 has a chamber width of 24⅞". The insulation in both manifolds is nominally 7" thick around the entire chamber 66. The intake plenum 82 can provide an intake flow area of about 85 sq.in.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A brazing system comprising:
   a brazing furnace having a first heated portion generating a heated gas, the furnace including a furnace inlet to receive materials to be brazed within the furnace and a furnace outlet for discharging the brazed materials therefrom;

a dry-off oven having an oven inlet for receiving materials to be brazed and an oven outlet for discharging the materials to said furnace inlet, the dry-off oven defining a chamber to be heated to a temperature sufficient to drive off moisture from the materials received therein; and a recovery system connected between the heated portion of said brazing furnace and said chamber of said dry-off oven, said recovery system defining a flowpath for heated gas from said first heated portion to travel to said chamber.

2. The brazing system according to claim 1, wherein said recovery system includes a valve apparatus for providing ambient air to said oven chamber to mix with the heated gas, said apparatus operable as a function of the temperature within said chamber.

3. The brazing system according to claim 2, wherein said valve apparatus includes:

a plenum having an inlet and an outlet in communication with said chamber of said oven;

a valve element movably disposed within said plenum to control the flow of ambient air through said inlet; and an actuator operable in response to the temperature within said chamber to control the movement of said valve element.

4. The brazing system according to claim 3, wherein said valve apparatus includes a temperature sensor disposed within said chamber and operable to provide a signal to said actuator indicative of the temperature within said chamber.

5. The brazing system according to claim 1, wherein said recovery system includes a number of first tubes in communication with said first heated portion, said number of first tubes defining at least a portion of said flowpath.

6. The brazing system according to claim 5, wherein:

said heated portion defines at least two temperature zones; and said number of first tubes includes at least two tubes with their respective mouths opening in different ones of said at least two temperature zones.

7. The brazing system according to claim 5, wherein said recovery system includes a number of manifolds outside said furnace and said dry-off oven, said manifolds in flow communication with said number of first tubes and defining a further portion of said flowpath.

8. The brazing system according to claim 7, wherein said number of manifolds are thermally insulated.

9. The brazing system according to claim 7, wherein said recovery system includes a number of second tubes disposed within said dry-off oven in flow communication with said number of manifolds and defining a further portion of said flowpath.

10. The brazing system according to claim 9, wherein said number of second tubes includes at least one tube with its mouth disposed adjacent said oven inlet.

11. The brazing system according to claim 10, wherein said number of second tubes includes two tubes with their respective mouths disposed adjacent said oven inlet.

12. The brazing system according to claim 9, wherein said number of second tubes includes at least two tubes with their respective mouths disposed at different locations between said oven inlet and said oven outlet.

13. The brazing system according to claim 9, wherein said number of second tubes includes at least three tubes disposed within said oven to direct the majority of the gas flow adjacent said oven inlet.

14. The brazing system according to claim 1, further comprising:

a pre-heat section disposed between said oven outlet and said furnace inlet, said pre-heat section having a section inlet for receiving materials from said oven outlet and a section outlet for discharging the materials to said furnace inlet, said pre-heat section having a second heated portion generating a heated gas;

wherein said recovery system defines a flowpath for heated gas from said second heated portion to travel to said chamber.

15. The brazing system according to claim 14, wherein said recovery system includes:

a number of first tubes in communication with said first heated portion; and a number of second tubes in communication with said second heated portion, wherein said number of first and second tubes define at least a portion of said flowpath.

16. The brazing system according to claim 15, wherein said recovery system includes:

a first manifold disposed between said furnace and said pre-heat section, and in flow communication with said number of first tubes; and a second manifold disposed between said pre-heat section and said dry-off oven, and in flow communication with said number of second tubes, wherein said first and second manifolds define a further portion of said flowpath.

17. The brazing system according to claim 16, wherein said first and second manifolds are thermally insulated.

18. The brazing system according to claim 15, wherein said recovery system includes a number of third tubes in flow communication between said first manifold and said second manifold.

19. The brazing system according to claim 18, wherein said number of third tubes extends through said pre-heat section.

20. The brazing system according to claim 1, wherein said recovery system includes means for drawing the heated gas along said flowpath to said chamber.

21. The brazing system according to claim 20, wherein said means for drawing includes at least one fan disposed within said dry-off oven.

22. The brazing system according to claim 21, wherein said recovery system includes a number of tubes defining at least a portion of said flowpath, the mouths of at least one of said number of tubes disposed at the suction side of said at least one fan.

23. A method for operating a brazing system having a brazing furnace and a dry-off oven, comprising the steps of:

heating the brazing furnace to generate heated gas;

conveying at least a portion of the heated gas to the dry-off oven to heat the oven, and introducing ambient air into the dry-off oven to mix with the heated gas to regulate the temperature within the oven.

24. A method for operating a brazing system having (i) a brazing furnace, (ii) a dry-off oven, and (iii) a pre-heat section disposed between the dry-off oven and the brazing furnace, comprising the steps of:

heating the brazing furnace to generate a first heated gas;

conveying at least a portion of the first heated gas to the dry-off oven to heat the oven, and heating the pre-heat section to generate a second heated gas; and conveying at least a portion of the second heated gas to the dry-off oven to heat the oven.

25. A method for operating a brazing system having a brazing furnace and a dry-off oven, comprising the steps of:

performing a brazing operation on material in the brazing furnace, said performing step including generating heated gas to heat said material in an interior of the brazing furnace; and conveying at least a portion of the heated gas from the interior of the brazing furnace to the dry-off oven to heat the oven.

26. The method of claim 25, wherein said conveying step includes conveying said at least said portion of the heated gas from the brazing furnace to the dry-off oven through at least one plenum.

27. The method of claim 26, wherein the brazing system further has a fan, and further comprising the step of:

creating a vacuum within said dry-off oven with said fan to draw said at least said portion of the heated gas from the brazing furnace to the dry-off oven through said at least one plenum.

28. The method of claim 25, wherein said heated gas generating step includes the step of generating said heated gas with gas fired heating elements.

29. The method of claim 25, wherein said heated gas generating step includes the step of generating said heated gas with electrical heating elements.

* * * * *